US012361855B2

(12) United States Patent
Rao

(10) Patent No.: US 12,361,855 B2
(45) Date of Patent: Jul. 15, 2025

(54) GATE DRIVE CIRCUIT AND DISPLAY PANEL

(71) Applicant: TCL CHINA STAR OPTOELECTRONICS TECHNOLOGY CO., LTD., Guangdong (CN)

(72) Inventor: Bing Rao, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,457

(22) PCT Filed: Apr. 20, 2022

(86) PCT No.: PCT/CN2022/087802
§ 371 (c)(1),
(2) Date: Apr. 29, 2022

(87) PCT Pub. No.: WO2023/193297
PCT Pub. Date: Oct. 12, 2023

(65) Prior Publication Data

US 2024/0153431 A1 May 9, 2024

(30) Foreign Application Priority Data

Apr. 7, 2022 (CN) ......................... 202210364785.5

(51) Int. Cl.
*G09G 3/20* (2006.01)
*G09G 3/3266* (2016.01)
*G09G 3/36* (2006.01)

(52) U.S. Cl.
CPC ......... *G09G 3/2092* (2013.01); *G09G 3/3266* (2013.01); *G09G 3/20* (2013.01);
(Continued)

(58) Field of Classification Search
CPC ............... G09G 3/2092; G09G 3/3266; G09G 2310/0267; G09G 2310/0264; G09G 3/20;
(Continued)

(56) References Cited

U.S. PATENT DOCUMENTS

2012/0038610 A1 2/2012 Li et al.
2015/0255172 A1 9/2015 Kuo et al.
(Continued)

FOREIGN PATENT DOCUMENTS

CN 105405421 A 3/2016
CN 109036307 A 12/2018
(Continued)

OTHER PUBLICATIONS

English Translation to CN109064982, published on Dec. 21, 2018. and 19 pages. (Year: 2018).*
(Continued)

*Primary Examiner* — William Boddie
*Assistant Examiner* — Saifeldin E Elnafia

(57) ABSTRACT

The disclosure relates to a gate drive circuit and a display panel. The gate drive circuit includes signal conversion circuits; the signal conversion circuit is for converting an input signal to be processed into a control signal and transmitting the control signal to a GOA circuit; and the GOA circuit performs a corresponding operation according to the control signal. The signal conversion circuit is added into the gate drive circuit in the present disclosure, thereby saving the signal lines for transmitting a gate high-level signal or a pull-down control signal, reducing the complexity of a GOA circuit region.

7 Claims, 4 Drawing Sheets

(52) U.S. Cl.
CPC ... *G09G 3/3674* (2013.01); *G09G 2300/0408* (2013.01); *G09G 2310/0264* (2013.01); *G09G 2310/0267* (2013.01); *G09G 2310/0286* (2013.01); *G09G 2310/08* (2013.01); *G09G 2330/028* (2013.01)

(58) Field of Classification Search
CPC ......... G09G 3/3674; G09G 2300/0408; G09G 2310/0286; G09G 2310/08; G09G 2330/028
See application file for complete search history.

(56) References Cited

U.S. PATENT DOCUMENTS

| | | | | |
|---|---|---|---|---|
| 2018/0293950 | A1* | 10/2018 | Lv | G09G 3/3677 |
| 2018/0301082 | A1* | 10/2018 | Zhang | G09G 3/3648 |
| 2019/0311691 | A1* | 10/2019 | Feng | G09G 3/36 |
| 2020/0035179 | A1* | 1/2020 | Chen | G09G 3/3648 |

FOREIGN PATENT DOCUMENTS

| | | | |
|---|---|---|---|
| CN | 109166552 | A | 1/2019 |
| CN | 109545164 | A | 3/2019 |
| CN | 112037728 | A | 12/2020 |
| CN | 112997239 | A | 6/2021 |
| CN | 113257168 | A | 8/2021 |

OTHER PUBLICATIONS

International Search Report in International application No. PCT/CN2022/087802,mailed on Dec. 15, 2022.

Written Opinion of the International Search Authority in International application No. PCT/CN2022/087802,mailed on Dec. 15, 2022.

Chinese Office Action issued in corresponding Chinese Patent Application No. 202210364785.5 dated Sep. 30, 2024, pp. 1-7.

* cited by examiner

GATE DRIVE CIRCUIT AND DISPLAY PANEL

TECHNICAL FIELD

The present disclosure relates to a display driving technical field, and in particular, to a gate drive circuit and a display panel.

BACKGROUND

With the development of display technology, performance requirements for display products are increasing. For example, in high-end display products, higher refresh rates and better display effects are constantly pursued. In order to improve the refresh rates and the display effects, a high-level signal is added into the GOA (Gate On Array) circuit region in the current techniques.

Technical Problems

The complexity of the GOA circuit region is increased by adding high-level signal lines, which results in an increase in the area of the GOA circuit region.

Technical Solutions

Based on this, it is necessary to provide a clock signal adjusting circuit, method, and display panel in view of the above technical problems.

A gate drive circuit includes N-stages GOA circuits and signal conversion circuits connected in a one-to-one correspondence with the GOA circuits.

Wherein the signal conversion circuit converts an input signal to be processed into a control signal and transmits the control signal to the GOA circuit; the GOA circuit performs a corresponding operation according to the control signal; the signal to be processed is a signal transmitted to the GOA circuit; and the control signal is a gate high-level signal or a pull-down control signal.

A display panel includes a display layer and a gate drive circuit.

The gate drive circuit is connected to the display layer.

The gate drive circuit includes N-stages GOA circuits and signal conversion circuits connected in a one-to-one correspondence with the GOA circuits.

Wherein the signal conversion circuit converts an input signal to be processed into a control signal and transmits the control signal to the GOA circuit; the GOA circuit performs a corresponding operation according to the control signal; the signal to be processed is a signal transmitted to the GOA circuit; and the control signal is a gate high-level signal or a pull-down control signal.

Beneficial Effects

A gate drive circuit in the present disclosure includes N-stages GOA circuits and signal conversion circuits. The N-stages GOA circuits are sequentially connected in cascade, and the signal conversion circuits are connected in a one-to-one correspondence with the N-stages GOA circuits. The signal conversion circuit converts an input signal to be processed into a control signal, and then transmits the control signal to the GOA circuit. The GOA circuit 1 performs a corresponding operation in accordance with the control signal. Since the signal conversion circuit is added into the gate drive circuit in the present disclosure, a gate high-level signal or a pull-down control signal is input from the signal conversion circuit to the GOA circuit, thereby saving signal lines for transmitting the gate high-level signal or the pull-down control signal, reducing the complexity of a GOA circuit region, and reducing the area of the GOA circuit region.

BRIEF DESCRIPTION OF THE DRAWINGS

In order to more clearly describe the technical solutions in embodiments of the present disclosure or the prior art, the accompanying drawings required in the description of the embodiments or the prior art will be briefly described below. Apparently, the accompanying drawings in the following description are merely some embodiments in the present disclosure, and other drawings may be obtained by a person of ordinary skill in the art without creative efforts.

EMBODIMENT OF THE PRESENT DISCLOSURE

For ease of understanding the present disclosure, the present disclosure will be described more fully below with reference to the related drawings. Preferred embodiments of the present disclosure are provided in drawings. However, the present disclosure may be implemented in many different forms and is not limited to the embodiments described herein. Rather, these embodiments are provided in order to make the disclosure of the present disclosure more thorough and comprehensive.

It should be noted that when one element is considered to be “connected” to another element, it may be directly connected to and integrated with another element, or there may be an interval element at the same time. The terms “installation,” “one end,” “another/other end,” and the like used herein are for illustrative purposes only.

Unless otherwise defined, all technical and scientific terms used herein have the same meaning as generally understood by those skilled in the art to which the present disclosure pertains. The terms used herein in the specification of the present disclosure are only for the purpose of describing specific embodiments and are not intended to limit the present disclosure. The term “and/or” as used herein includes any and all combinations of one or more related listed items.

A GOA circuit 1 region, or a GOA drive layer, is used to drive a display layer in a display panel to emit light. In the current technique, in order to transmit a signal, a plurality of signal lines, for example, a gate control line, a pull-down control line, a data signal line, and the like, are provided in the GOA circuit 1 region. The complexity of the GOA circuit 1 region is increased by providing a plurality of signal lines, which results in a large area of the GOA circuit 1 region.

Figure 1:
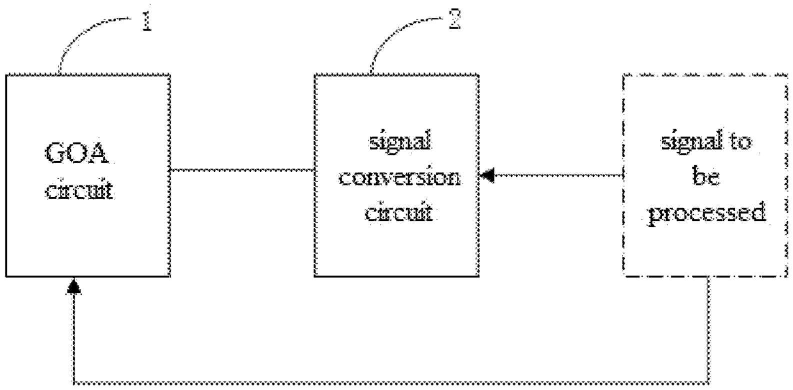
FIG. 1 is a structural schematic view of a gate drive circuit according to an embodiment of the present disclosure.

In order to solve the above problems, as shown in FIG. 1, there is provided a gate drive circuit including N-stages GOA circuits 1 and signal conversion circuits 2 connected in a one-to-one correspondence with the GOA circuits 1.

The GOA circuits 1 drive a display layer of a display panel to emit light. The N-stages GOA circuits 1 are connected in cascade, and are connected in a one-to-one correspondence with the scan lines. The number of the GOA circuits 1 is set according to the resolution of the display panel. For example, in a display panel having a resolution of 2048*1024, the GOA circuits 1 have at least 1024 stages.

During the operation of the GOA circuit, it is necessary to acquire an externally input signal. The signal conversion circuit 2 is configured to input a control signal required by the GOA circuit 1 to the GOA circuit 1. Specifically, the signal conversion circuit 2 converts an input signal to be processed into the control signal, and transmits the control signal to the GOA circuit 1. The GOA circuit 1 performs a corresponding operation according to the control signal. The control signal may be a waveform signal. In one example, the control signal is a gate high-level signal. The gate high-level signal is for instructing the GOA circuit 1 to come into operation. In another example, the control signal is a pull-down control signal for instructing the GOA circuit 1 to pull-down a potential of a Q node. Note that the signal to be processed may be an input signal from an external, or may be an input signal from the gate drive circuit. Note that the signal to be processed is a signal transmitted to the GOA circuit 1, that is, a signal directly transmitted to the GOA circuit 1 through signal lines of the gate drive circuit.

The connection relationship between the specific configuration of the signal conversion circuit 2 and related devices when the control signal is the gate high-level signal or a pull-down control signal is described in detail below.

In one example, when the control signal is the gate high-level signal, the signal to be processed includes a first pull-down control signal transmitted by the first pull-down control line and a second pull-down control signal transmitted by the second pull-down control line. Wherein the first pull-down control line and the second pull-down control line are signal lines arranged at the gate drive circuit.

Figure 2:
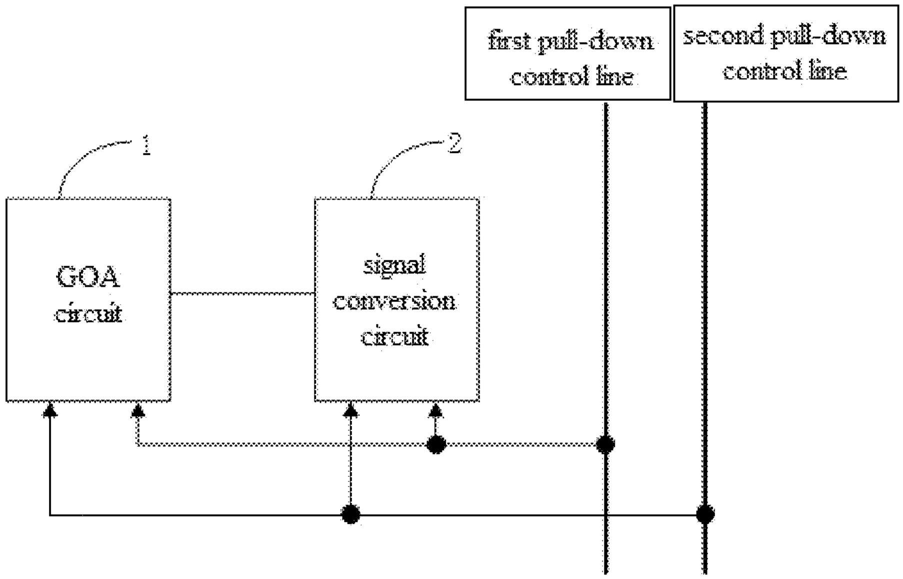
FIG. 2 is a schematic view of a signal line connection relationship of a gate drive circuit according to an embodiment of the present disclosure.

As shown in FIG. 2, the signal conversion circuit 2 is connected to the GOA circuit 1, the first pull-down control line and the second pull-down control line, respectively. The GOA circuit 1 is connected to the first pull-down control line and the second pull-down control line, respectively. The first pull-down control signal transmitted in the first pull-down control line is transmitted by the first pull-down control line to the signal conversion circuit 2 and the GOA circuit 1. The second pull-down control signal transmitted in the second pull-down control line is transmitted by the second pull-down control line to the signal conversion circuit 2 and the GOA circuit 1. The signal conversion circuit 2 converts the first pull-down control signal and the second pull-down control signal into the gate high-level signal, and transmits the gate high-level signal to the GOA circuit 1.

Figure 3:
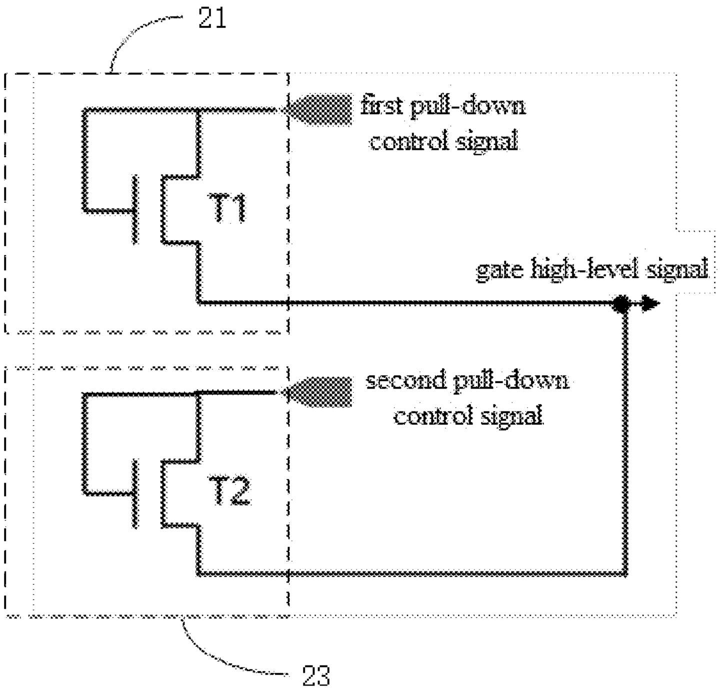
FIG. 3 is a structural schematic view of a signal conversion circuit according to an embodiment of the present disclosure.

The signal conversion circuit 2 is implemented in various ways. In one example, as shown in FIG. 3, the signal conversion circuit 2 includes a first switching unit 21 and a second switching unit 23. A first terminal of the first switching unit 21 is connected to the first pull-down control line, and a second terminal of the first switching unit 21 is connected to a first terminal of the second switching unit 23 and the GOA circuit 1, respectively. A second terminal of the second switching unit 23 is connected to the second pull-down control line.

It should be noted that the first switching unit 21 may be turned off and on under the driving of a corresponding start signal. The first switching unit 21 is implemented in various manners. In one example, as shown in FIG. 3, the first switching unit 21 includes a first thin film transistor T1. A gate and a source of the first thin film transistor T1 are connected to the first pull-down control line, and a drain of the first thin film transistor T1 is connected to the first terminal of the second switching unit 23 and the GOA circuit 1.

The second switching unit 23 may be turned off and on under the driving of a corresponding start signal. The second switching unit 23 is implemented in various manners. In one example, as shown in FIG. 3, the second switching unit 23 includes a second thin film transistor T2. A gate and a source of the second thin film transistor T2 are connected to the second pull-down control line. A drain of the second thin film transistor T2 is connected to the second terminal of the first switching unit 21 and the GOA circuit 1, respectively.

Figure 4:
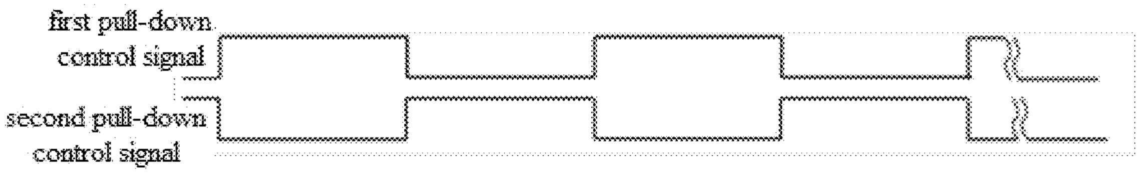
FIG. 4 is a waveform view of a signal according to an embodiment of the present disclosure.

The first pull-down control signal and the second pull-down control signal as shown in FIG. 4 are taken as an example for description. When the first pull-down control signal is at a high-level and the second pull-down control signal is at a low level, the first thin film transistor is turned on, and the gate high-level signal is the first pull-down control signal of a high-level. When the second pull-down control signal is at a high-level and the first pull-down control signal is at a low level, the second thin film transistor is turned on, and the gate high-level signal is the second pull-down control signal of a high-level. The gate high-level signal is composed of the first pull-down control signal of a high-level and the second pull-down control signal of a high-level. Thus, the gate drive circuit in this example can save the gate control line, thereby reducing the complexity of the gate drive circuit.

In another example, when the control signal is a pull-down control signal. The signal to be processed includes an original pull-down control signal transmitted by the pull-down control line, and a gate high-level signal transmitted by the gate control line. Wherein the pull-down control line and the gate control line are signal lines arranged at the gate drive circuit.

Figure 5:
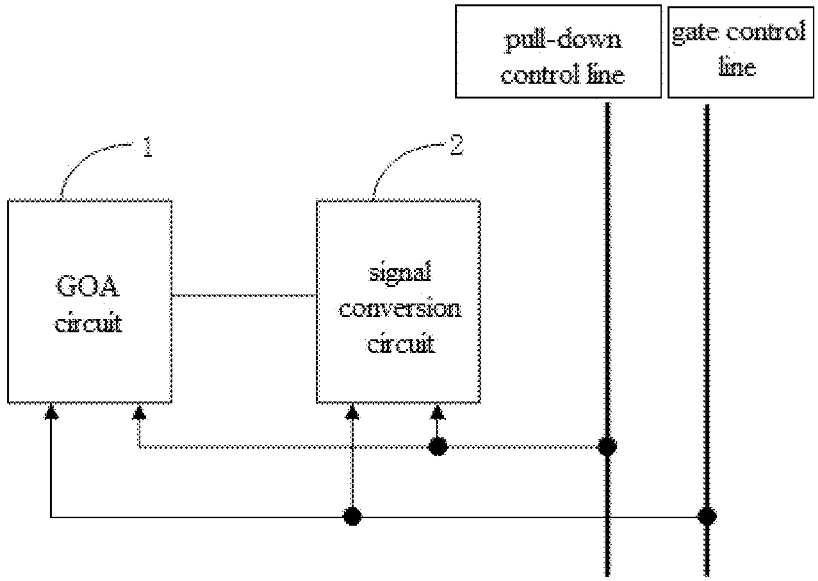
FIG. 5 is a schematic view of another signal line connection relationship of a gate drive circuit according to an embodiment of the present disclosure.

As shown in FIG. 5, the signal conversion circuit 2 is connected to the GOA circuit 1, the pull-down control line, and the gate control line, respectively. The GOA circuit 1 is connected to a pull-down control line and a gate control line, respectively. Note that the original pull-down control signal transmitted through the pull-down control line is transmitted to the GOA circuit 1 and the signal conversion circuit 2, respectively, through the pull-down control line. The gate high-level signal transmitted through the gate control line is transmitted to the GOA circuit 1 and the signal conversion circuit 2 through the gate control line. The signal conversion circuit 2 converts the original pull-down control signal and the gate high-level signal into a pull-down control signal, and transmits the pull-down control signal to the GOA circuit 1.

Figure 6:
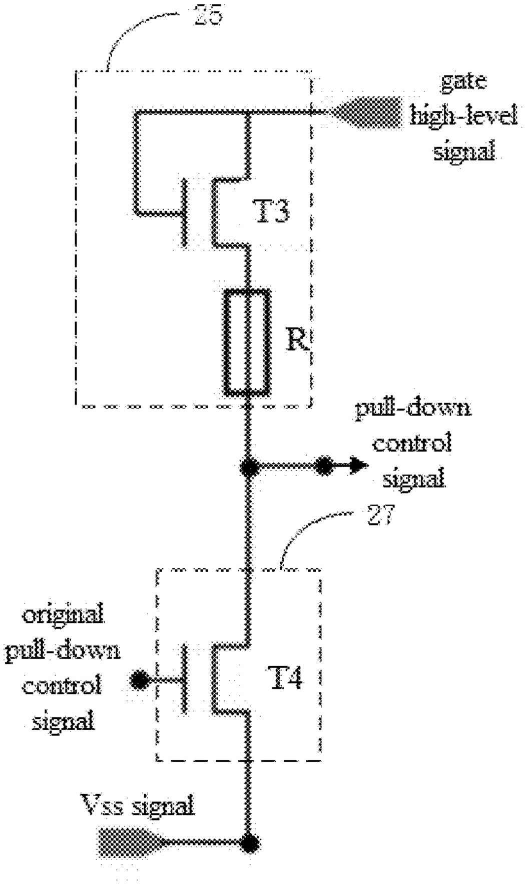
FIG. 6 is another structural schematic view of a signal conversion circuit according to an embodiment of the present disclosure.

The signal conversion circuit 2 is implemented in various ways. In one example, as shown in FIG. 6, the signal conversion circuit 2 includes a third switching unit 25 and a fourth switching unit 27. A first terminal of the third switching unit 25 is connected to the gate control line, and a second terminal of the third switching unit 25 is connected to the first terminal of the fourth switching unit 27 and the GOA circuit 1, respectively. A second terminal of the fourth switching unit 27 is connected to the pull-down control line, and a third terminal is connected with a Vss signal.

The third switching unit 25 is implemented in a variety of ways. In one example, as shown in FIG. 6, the third switching unit 25 includes a third thin film transistor T3 and a resistor R. A gate and a source of the third thin film transistor T3 are connected to the gate control line, and the drain of the third thin film transistor T3 is connected to the first terminal of the fourth switching unit 27 and the GOA circuit 1, respectively, through the resistor R.

The fourth switching unit 27 is implemented in a variety of ways. In one example, as shown in FIG. 6, the fourth switching unit 27 includes a fourth thin film transistor T4. A drain of the fourth thin film transistor T4 is connected to the second terminal of the third switching unit 25 and the GOA circuit 1, respectively, a gate of the fourth thin film transistor T4 is connected to the pull-down control line, and a source of the fourth thin film transistor T4 is connected with the Vss signal.

Figure 7:
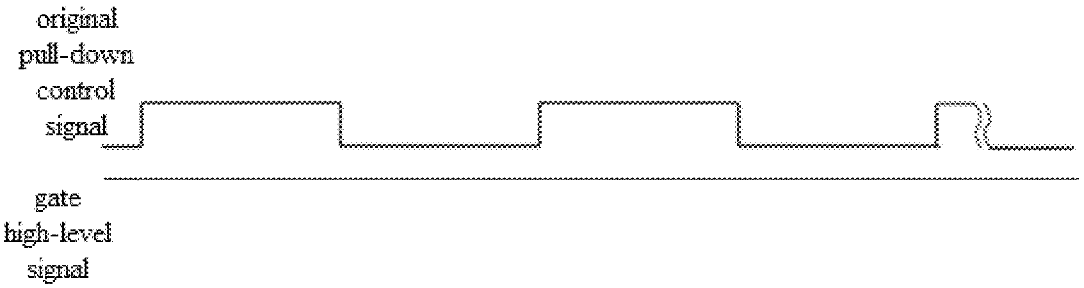
FIG. 7 is a waveform view of another signal according to an embodiment of the present disclosure.

The original pull-down control signal and the gate high-level signal shown in FIG. 7 are taken as an example for description. When the original pull-down control signal is at the high-level, the fourth thin film transistor T4 is turned on, and the pull-down control signal is the Vss signal, that is, the pull-down control signal is at the low level. When the original pull-down control signal is at the low level, the fourth thin film transistor T4 is turned off, and the pull-down control signal is the gate high-level signal, that is, the pull-down control signal is at the high-level. Therefore, the gate drive circuit in this example can save one pull-down control line, thereby reducing the complexity of the gate drive circuit.

The gate drive circuit in the present disclosure includes N-stages GOA circuits 1 and signal conversion circuits 2. The N-stages GOA circuits 1 are sequentially connected in cascade, and the signal conversion circuits 2 are connected in a one-to-one correspondence with the N-stages GOA circuits 1. The signal conversion circuit 2 converts an input signal to be processed into the control signal, and transmits the control signal to the GOA circuit 1. The GOA circuit 1 performs a corresponding operation according to the control signal. Since the signal conversion circuit 2 is added into the gate drive circuit in the present disclosure, the gate high-level signal or the pull-down control signal is input from the signal conversion circuit 2 to the GOA circuit 1, thereby saving the signal lines for transmitting the gate high-level signal or the pull-down control signal, reducing the complexity of the GOA circuit 1 region, and reducing the area of the GOA circuit 1 region. Meanwhile, the production process may be simplified.

The gate drive circuit in the present disclosure is applied to a display panel. There is provided a display panel including a display layer and a gate drive circuit as described above. The gate drive circuit is connected to the display layer for driving the display layer to emit light.

It should be noted that the display layer emits light under the driving of the gate drive circuit to display content. The gate drive circuit in this embodiment is the same as a gate drive circuit of the gate drive circuits in the present disclosure. For details, refer to the foregoing embodiments, and details are not described herein again.

In the display panel in the present disclosure, since the configuration of the gate drive circuit is simple and the area thereof is small, the size of the display panel is small, which simplifies the production process and saves costs.

The technical features of the above-described embodiments may be arbitrarily combined, and for the sake of brevity, all possible combinations of the technical features of the above-described embodiments are not described. However, as long as the combination of these technical features is not inconsistent, it should be considered to fall within the scope of this specification.

The above-described embodiments merely represent a few embodiments in the present disclosure, the description of the above-described embodiments is more specific and detailed, but are not therefore to be construed as limiting the scope of the application. It should be noted that, for those of ordinary skill in the art, several modifications and improvements may also be made without departing from the concept of the present disclosure, and fall within the scope of the present disclosure. Accordingly, the scope of the patent disclosure shall be subject to the appended claims.

What is claimed is:

1. A gate drive circuit comprising N-stages GOA circuits and signal conversion circuits connected in a one-to-one correspondence with the GOA circuits;

wherein for at least one of the N stages, the GOA circuit and the signal conversion circuit are both electrically connected to two signal lines for transmitting input signals to be processed, and wherein the signal conversion circuit receives the input signals to be processed from the two signal lines, converts the input signals to be processed into a control signal, and transmits the control signal to the GOA circuit; the GOA circuit performs a corresponding operation according to the control signal and the input signals to be processed from the two signal lines; the signal to be processed is a signal transmitted to the GOA circuit; and the control signal is a gate high-level signal or a pull-down control signal, wherein when the control signal is the gate high-level signal, the signal to be processed comprises a first pull-down control signal transmitted by a first pull-down control line as one of the two signal lines and a second pull-down control signal transmitted by a second pull-down control line as another one of the two signal lines; the signal conversion circuit is directly connected to the GOA circuit, the first pull-down control line, and the second pull-down control line, respectively; and the GOA circuit is directly connected to the first pull-down control line and the second pull-down control line, respectively, wherein the signal conversion circuit respectively converts the first pull-down control signal and the second pull-down control signal into the gate high-level signal, and transmits the gate high-level signal to the GOA circuit, wherein when the control signal is the pull-down control signal, the signal to be processed comprises an original pull-down control signal transmitted by a pull-down control line as one of the two signal lines, and the gate high-level signal transmitted by a gate control line as another one of the two signal lines; the signal conversion circuit is directly connected to the GOA circuit, the pull-down control line, and the gate control line, respectively; the GOA circuit is directly connected to the pull-down control line and the gate control line, respectively, wherein the signal conversion circuit converts the original pull-down control signal and the gate high-level signal into the pull-down control signal, and transmits the pull-down control signal to the GOA circuit, and wherein the signal conversion circuit comprises a third switching unit and a fourth switching unit; a first terminal and a third terminal of the third switching unit are connected to the gate control line, and a second terminal of the third switching unit is directly connected to a first terminal of the fourth switching unit and the GOA circuit, respectively; and a second terminal of the fourth switching unit is connected to the pull-down control line, and a third terminal of the fourth switching unit is connected with a Vss signal.

2. The gate drive circuit according to claim 1, wherein the third switching unit comprises a third thin film transistor and a resistor; and a gate and a source of the third thin film transistor are connected to the gate control line, and a drain of the third thin film transistor is respectively connected to the first terminal of the fourth switching unit and the GOA circuit through the resistor.

3. The gate drive circuit according to claim 1, wherein the fourth switching unit comprises a fourth thin film transistor;

a drain of the fourth thin film transistor is connected to the second terminal of the third switching unit and the GOA circuit, respectively, a gate of the fourth thin film transistor is connected to the pull-down control line, and a source of the fourth thin film transistor is connected with the Vss signal.

4. A display panel comprising a display layer and a gate drive circuit;

wherein the gate drive circuit is connected to the display layer; and the gate drive circuit comprises N-stages GOA circuits and signal conversion circuits connected in a one-to-one correspondence with the GOA circuits;

wherein for at least one of the N stages, the GOA circuit and the signal conversion circuit are both electrically connected to two signal lines for transmitting input signals to be processed, and wherein the signal conversion circuit receives the input signals to be processed from the two signal lines, converts the input signals to be processed into a control signal, and transmits the control signal to the GOA circuit; the GOA circuit performs a corresponding operation according to the control signal and the input signals to be processed from the two signal lines; the signal to be processed is a signal transmitted to the GOA circuit; and the control signal is a gate high-level signal or a pull-down control signal, wherein when the control signal is the gate high-level signal, the signal to be processed comprises a first pull-down control signal transmitted by a first pull-down control line as one of the two signal lines and a second pull-down control signal transmitted by a second pull-down control line as another one of the two signal lines; the signal conversion circuit is directly connected to the GOA circuit, the first pull-down control line, and the second pull-down control line, respectively; and the GOA circuit is directly connected to the first pull-down control line and the second pull-down control line, respectively, wherein the signal conversion circuit respectively converts the first pull-down control signal and the second pull-down control signal into the gate high-level signal, and transmits the gate high-level signal to the GOA circuit, wherein when the control signal is the pull-down control signal, the signal to be processed comprises an original pull-down control signal transmitted by a pull-down control line as one of the two signal lines, and the gate high-level signal transmitted by a gate control line as another one of the two signal lines; the signal conversion circuit is directly connected to the GOA circuit, the pull-down control line, and the gate control line, respectively; the GOA circuit is directly connected to the pull-down control line and the gate control line, respectively, wherein the signal conversion circuit converts the original pull-down control signal and the gate high-level signal into the pull-down control signal, and transmits the pull-down control signal to the GOA circuit, and wherein the signal conversion circuit comprises a third switching unit and a fourth switching unit; a first terminal and a third terminal of the third switching unit are connected to the gate control line, and a second terminal of the third switching unit is directly connected to a first terminal of the fourth switching unit and the GOA circuit, respectively; and a second terminal of the fourth switching unit is connected to the pull-down control line, and a third terminal of the fourth switching unit is connected with a Vss signal.

5. The display panel according to claim 4, wherein the third switching unit comprises a third thin film transistor and a resistor;

a gate and a source of the third thin film transistor are connected to the gate control line, and a drain of the third thin film transistor is respectively connected to the first terminal of the fourth switching unit and the GOA circuit through the resistor.

6. The display panel according to claim 4, wherein the fourth switching unit comprises a fourth thin film transistor;

a drain of the fourth thin film transistor is connected to a second terminal of the third switching unit and the GOA circuit, respectively, a gate of the fourth thin film transistor is connected to the pull-down control line, and a source of the fourth thin film transistor is connected with the Vss signal.

7. The display panel according to claim 4, wherein the control signal is a waveform signal, the gate high-level signal is for instructing the GOA circuit to come into operation, and the pull-down control signal is for instructing the GOA circuit to pull-down a potential of a node of the GOA circuit.

* * * * *